US005833342A

United States Patent [19]

Echapare Ibarrola et al.

[11] Patent Number: 5,833,342
[45] Date of Patent: Nov. 10, 1998

[54] DEVICE FOR THE SUCCESSIVE DISPLAY OF PICTURES IN RECREATIONAL MACHINES

[75] Inventors: Jesús Echapare Ibarrola; José Luis Pina Insausti, both of Pamplona, Spain

[73] Assignee: Azkoyen Industrial, S.A., Spain

[21] Appl. No.: 805,626

[22] Filed: Feb. 26, 1997

[30] Foreign Application Priority Data

Feb. 26, 1996 [ES] Spain .................................... 9600444

[51] Int. Cl.[6] ..................................................... G03B 23/08
[52] U.S. Cl. ......................... 353/109; 273/143 R; 40/472
[58] Field of Search .................................... 353/103, 109, 353/108; 40/472, 524; 273/143 R, 138.1; 463/34

[56] References Cited

U.S. PATENT DOCUMENTS

| | | | |
|---|---|---|---|
| 1,260,673 | 3/1918 | Isbills | 353/109 |
| 1,856,234 | 5/1932 | Birdsall | 353/109 |
| 2,178,300 | 10/1939 | Dixon et al. | 273/143 B |
| 3,703,778 | 11/1972 | Pfleger | 40/472 |
| 5,108,349 | 4/1992 | Yamamoto | 273/143 R |
| 5,135,224 | 8/1992 | Yamamoto et al. | 273/143 R |

FOREIGN PATENT DOCUMENTS

| | | |
|---|---|---|
| 0750282 | 12/1996 | European Pat. Off. . |

*Primary Examiner*—William Dowling
*Attorney, Agent, or Firm*—Rothwell, Figg, Ernst & Kurz P.C.

[57] ABSTRACT

Device for the successive display of pictures in recreational machines, the device of which consists of a structure or frame which serves as a support for a series of rollers consisting of two synchronised drag rollers, consecutive and having a fixed position (2 and 2) and at least one removable guide roller (4), the position of which can be adjusted. The device may also include at least one fixed-position guide roller (5).

3 Claims, 3 Drawing Sheets

DEVICE FOR THE SUCCESSIVE DISPLAY OF PICTURES IN RECREATIONAL MACHINES

The object of the present invention is a device for the successive display of pictures in recreational machines.

European patent application No. 96500083.9 made by the same applicant, refers to a device for the successive display of pictures in recreational machines which consists of a structure or frame which serves as a support for a series of drag and guide rollers upon which is mounted a flexible endless band. The band has printed upon it a series of motifs or pictures and passes, in a section of the circuit, in front of a display window.

The series of rollers upon which the band is mounted is comprised by at least six rollers: two consecutive and synchronised drag rollers, located on either side of the display window; at least two, fixed position consecutive guide rollers; and two non-consecutive guide rollers which are removable and of an adjustable position.

The arrangement of the two consecutive and synchronised drag rollers means that the tautness and length of the section of the band which passes in front of the display window can be kept constant, ensuring the correct positioning of the motifs in front of the window.

The purpose of the removable, adjustable position guide rollers is to be able to adjust the device to different band lengths and, fundamentally, to make it easy to dismount and remove the band.

The object of the present invention is certain improvements made to the device described above, by means of which the mechanisms and structure of the assembly are reduced and simplified considerably, without impairing the aforementioned advantages.

In accordance with the present invention, the series of rollers upon which the band is mounted is comprised by at least three rollers: two fixed-position, synchronised drag rollers, and one guide roller which is removable and the position of which can be adjusted between at least two positions of which can be adjusted between at least two positions located at a different distance from the plane defined by the two drag rollers.

The guide roller will be easily removable and can be mounted between side supports that bend crosswise, so that when they are pulled apart the roller is released and can be removed, as a result of which the band can be dismounted and removed.

The series of rollers can also be comprised by four rollers: two consecutive fixed-position, synchronised drag rollers, as in the previous case, and two consecutive guide rollers which are located on different sides of the band, with one of the guide rollers, preferably the one located inside the band, being of a fixed position, whereas the other guide roller is removable and is of an adjustable position.

This arrangement reduces the number of rollers upon which the band is mounted, and since there is always a removable and, adjustable position roller, the device can be adapted to different band lengths and, fundamentally, it is easy to dismount and remove the band, by just dismounting the corresponding guide roller.

Moreover, maintaining the two fixed-position, synchronised drag rollers, located on either side of the display window, ensures the tautness and length of the section of the band which passes in front of the display window, and the correct positioning of the printed motifs in front of the window.

The features described above will be easier to understand with the following description, made with reference to the enclosed drawings, which show a non-limiting example of embodiment.

Figure 1:
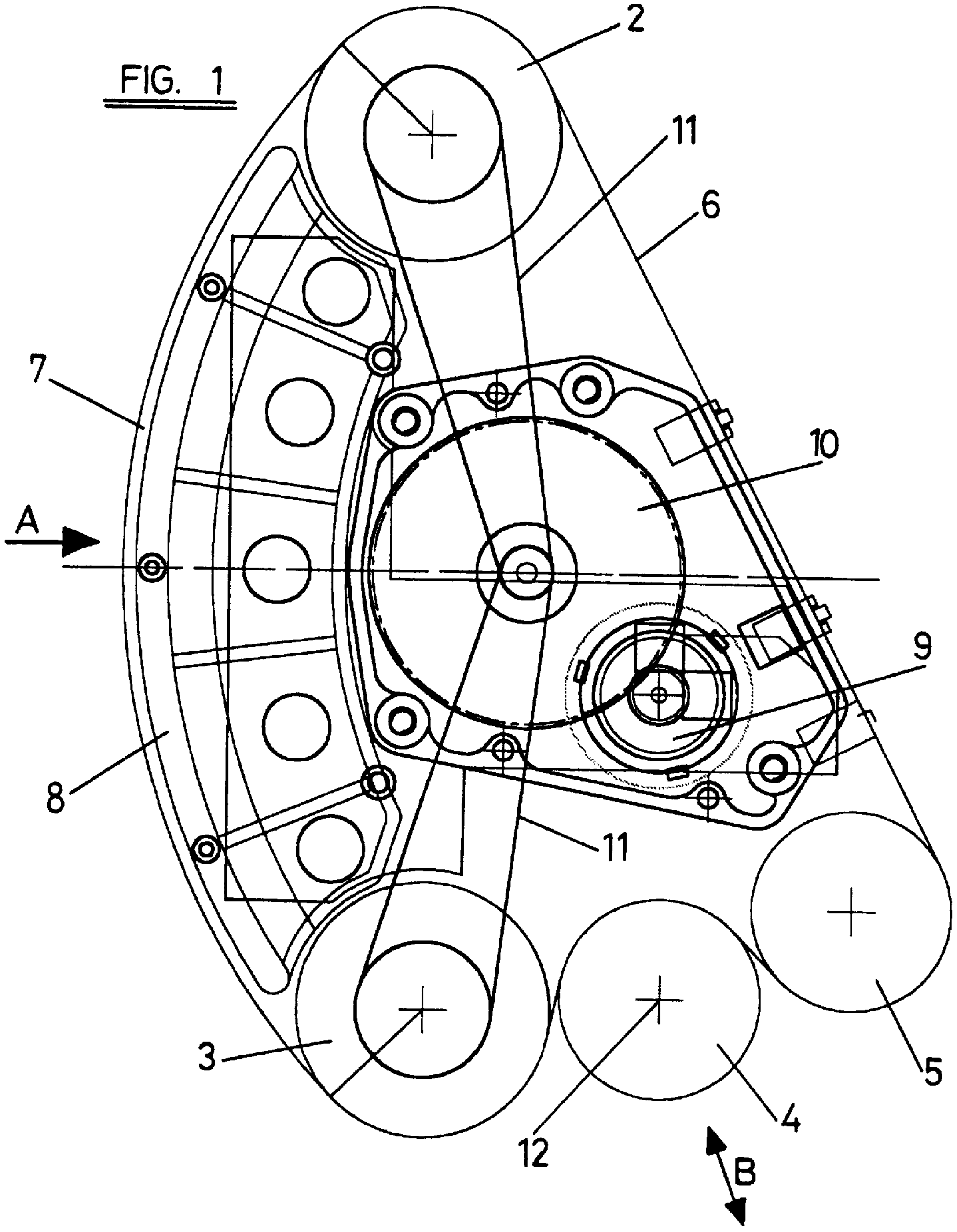
FIG. 1 is a side view of a device built in accordance with the invention, in which the anterior wall of the structure has been replaced to show the position of the different rollers better.
Figure 2:
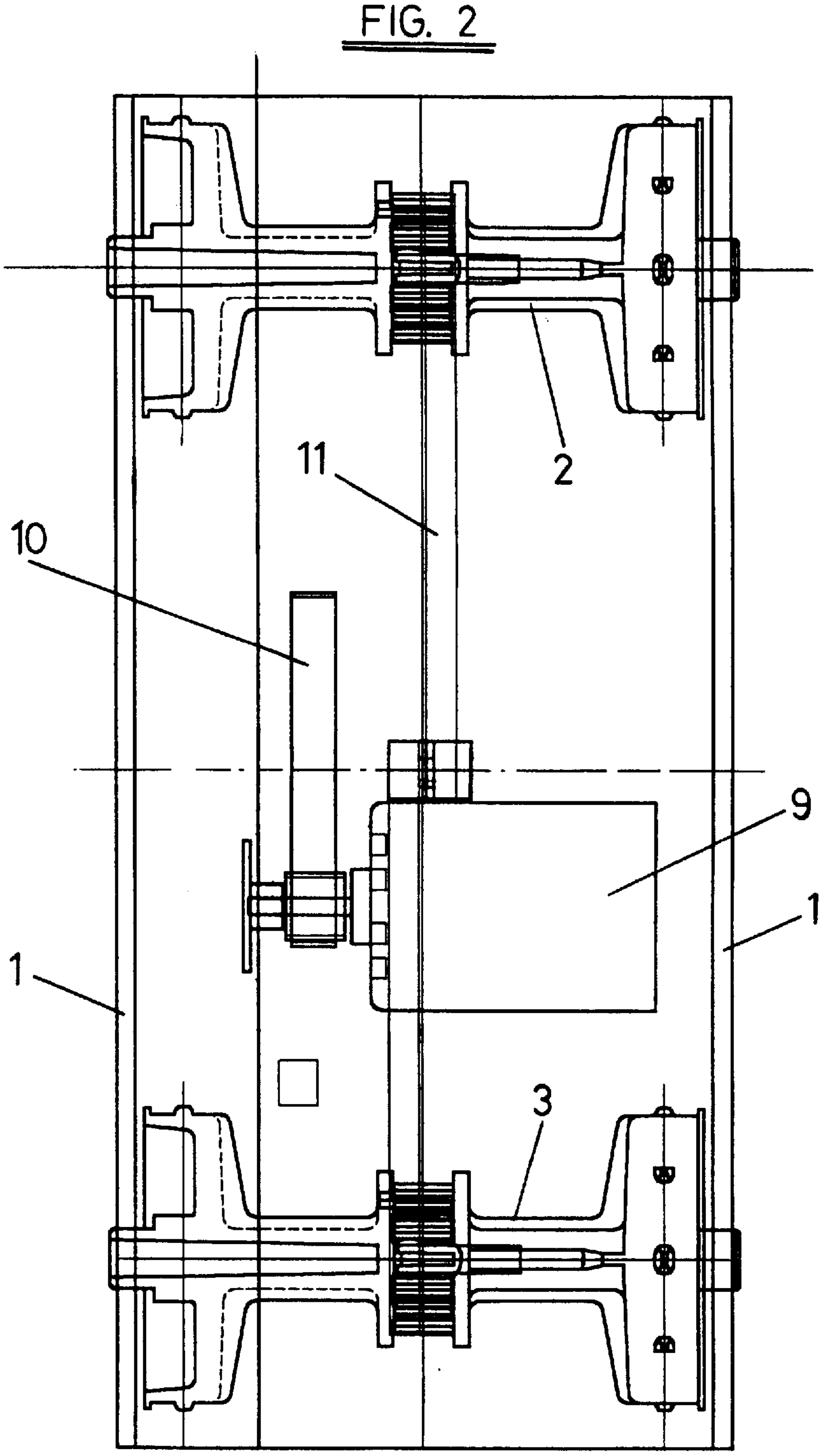
FIG. 2 is a front view of the device, in direction A of FIG. 1.

The device shown in FIGS. 1 and 2 includes a frame comprising two parallel walls 1, FIG. 2, joined by means of intermediate cross beams which are not illustrated. Mounted on the frame are four parallel rollers, labelled numbers 2, 3, 4 and 5 and which serve to support a band 6 which carries pictures or motifs which will be visible when the said band passes in front of a display window, located in section 7, which may follow a curved-convex or straight line, defined by the support 8, which carries the lighting devices.

Rollers 2 and 3 are joined to a drive motor 9 via a set of reduction gears 10 and drive pulleys 11, for example of the toothed type.

Constructed in this fashion, rollers 2 and 3 are synchronised driving rollers, each being located on one side of the display window 7.

As regards the two guide rollers, the roller labelled number 4 is located on the outer side of band 6, while the roller labelled number 5 is located on the inner side of the said band.

One of these rollers, preferably the one labelled number 4, will be removable and of an adjustable position, and its shaft 12 may be moved in the direction of arrows B, in order to adjust the different lengths of band 6.

Figure 4:
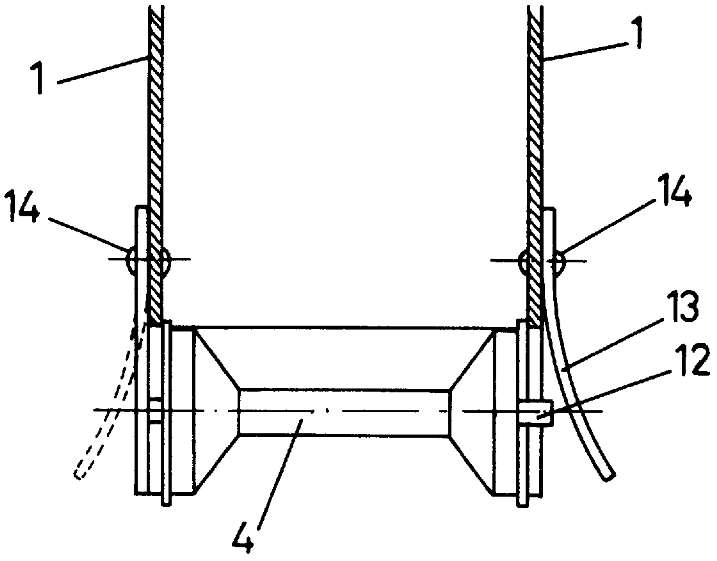
FIG. 4 is a partial cross-section of the device, cut along the IV—IV line of FIG. 3.
Figure 3:
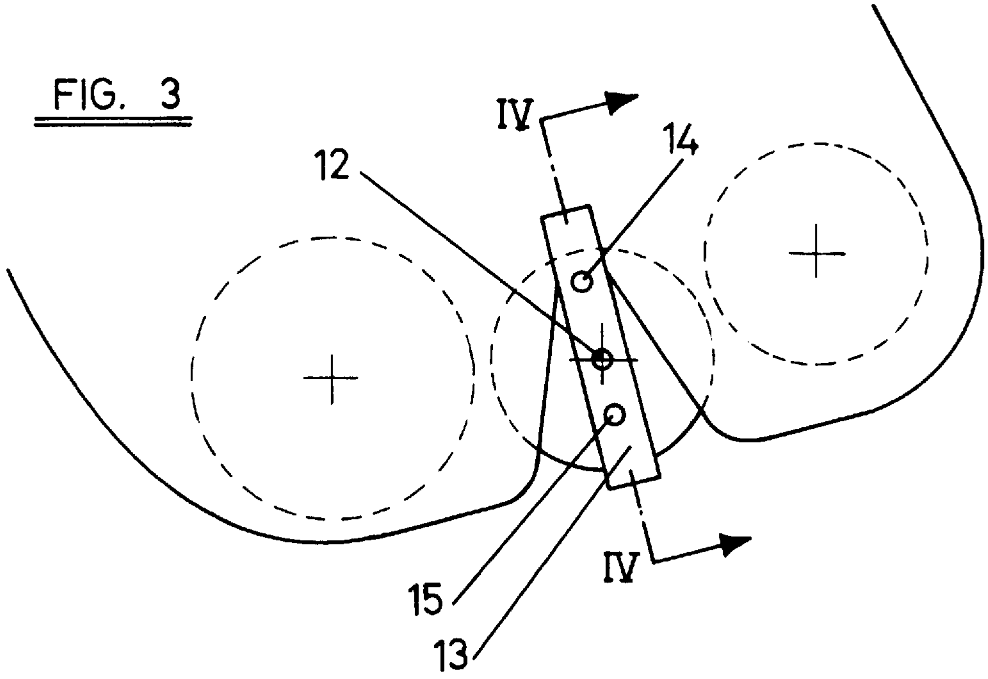
FIG. 3 is a partial side view of the device, showing the area occupied by the guide rollers.

The guide roller 4 can be mounted, as described in European patent application number 96500083.9, between supports or bands 13, FIGS. 3 and 4, which are fixed to plates 1 of the frame by means of rivets or bolts 14 and have two or more orifices 15 to receive the shaft 12 of roller 4.

Constructed in this fashion, by pushing the supports or bands 13 outwards, the shaft 12 of roller 4 can be removed or placed in different orifices 15.

In the first case, if roller 4 is removed, band 6 is freed and can be dismounted without having to perform any other operation.

If roller 4 is changed to a different position, and placed in different orifices 15, the device can be adapted to different band lengths.

In the example illustrated in the drawings, the device includes four rollers: two drag rollers labelled numbers 2 and 3, and two guide rollers labelled numbers 4 and 5. However, the device could also be formed by only three rollers: two synchronised, fixed-position drag rollers and one guide roller, adjustable in position and the vertices of a triangle, with it being possible to move the guide roller, in its different positions, in a direction perpendicular to the plane defined by the drag rollers.

Both whether the device is formed by one or two guide rollers, the arrangement is considerably simpler because the number of rollers has been reduced with regard to the prior art as exemplified in the device described in European patent application No. 96500083.9, keeping and maintaining the advantages described therein.

Apart from that, the device described in this invention can be equipped with the same lighting and control devices as described in European patent application No. 96500083.9.

We claim:

1. A device for the successive display of pictures in recreational machines, comprising support means for supporting at least three parallel rollers, wherein at least two of said parallel rollers are fixed-position, synchronized drag rollers, and at least one of said parallel rollers is a guide roller which is removable, wherein said guide roller may be adjusted between at least two positions, each of said at least two positions being located at a different distance from a plane defined by said at least two drag rollers relative to the other of said at least two positions, a flexible endless band mounted upon said at least three parallel rollers and forming a circuit, said flexible band having printed thereon a series of motifs which pass, in a section of the circuit, in front of a display window.

2. The device of claim 1, wherein the rollers comprise two consecutive fixed-position, synchronized drag rollers, and two consecutive guide rollers which are located on different sides of said band, wherein one of said guide rollers, is of a fixed position, whereas the other guide roller is removable and is of an adjustable position.

3. The device of claim 2, wherein said fixed position guide is located inside said flexible band.

* * * * *